UNITED STATES PATENT OFFICE.

MILTON C. WHITAKER, OF NEW YORK, N. Y., ASSIGNOR TO THE SOUTHERN COTTON OIL COMPANY, OF NEW YORK, N. Y., A CORPORATION OF NEW JERSEY.

REMOVING NICKEL FROM HYDROGENIZED FAT OR OIL.

1,242,624.  Specification of Letters Patent.  Patented Oct. 9, 1917.

No Drawing.  Application filed June 12, 1913.  Serial No. 773,198.

*To all whom it may concern:*

Be it known that I, MILTON C. WHITAKER, a citizen of the United States, residing at borough of Manhattan, city, county, and State of New York, have invented certain new and useful Improvements in Removing Nickel from Hydrogenized Fat or Oil; and I do hereby declare the following to be a full, clear, and exact description of the invention, such as will enable others skilled in the art to which it appertains to make and use the same.

In the hydrogenation of unsaturated edible oils, such as cotton-seed oil, and the like, by means of a nickel catalyst, it is difficult, in ordinary practice, to entirely separate the last trace of nickel from the hardened product of the hydrogenating operation. As a consequence, there is usually left in the product a residue of nickel, either in the solid state corresponding to the catalyst employed, or in solution.

I have discovered that the hydrogenized fat or oil may be quantitatively relieved of the free and combined nickel present, whether in suspension or solution, by treating it with fullers' earth.

In the practice of the invention, after the hydrogenation of the fat or oil, and while it is still in the liquid condition, it is drawn off into a suitable receptacle and vigorously agitated therein with fullers' earth. The hydrogenized fat or oil may be thus treated immediately after it leaves the so-called hydrogenizing converter, or after it has passed through the filter press, its temperature, under these conditions, being still sufficiently high to maintain it in the liquid condition during the fullers' earth treatment; or, if it has cooled below the melting point, it is first restored to the liquid condition by the application of heat. After the hydrogenized fat or oil has been treated with the fullers' earth, the fat or oil may be filtered.

A specific example of an operation conducted in accordance with the invention may be given, by way of illustration, as follows:

To 1 kilo of hydrogenated oil from which the suspended catalyzer has been removed by filtration, from 1 to 2% by weight of fullers' earth may be added. The hydrogenated oil is maintained at a temperature above its melting point, whatever that may be, and, after vigorous agitation with the fullers' earth, the charge is immediately filtered to remove the fullers' earth which has been added. It is found, on examination, that the filtrate is entirely free from nickel. Should there be a large excess of nickel soap in the oil, a larger amount of fullers' earth than that specified above will be required. 2% of fullers' earth, however, is sufficient to remove all of the nickel, whether free or combined, left in the oil after reasonably careful filtration to remove the catalyzer.

In the practice of the invention, I have found that dehydration of the fullers' earth which I have used takes place at temperatures exceeding 100° C. or thereabout, and that the fullers' earth thereby loses its efficiency for the purposes of the present invention. For this reason, care should be taken not to operate at higher temperatures where the dehydration of the fullers' earth would destroy its function for purposes of the invention.

Having thus described my invention, what I claim is:—

1. The method of removing nickel from hydrogenized fat or oil in which it is held in suspension or solution, which comprises treating a liquid body of the hydrogenized fat or oil with fullers' earth; substantially as described.

2. The method of removing nickel from hydrogenized fat or oil in which it is held in suspension or solution, which comprises treating a liquid body of the hydrogenized fat or oil with fullers' earth at a temperature below the dehydration temperature of the fullers' earth; substantially as described.

In testimony whereof I affix my signature, in presence of two witnesses.

MILTON C. WHITAKER.

Witnesses:
 L. BATES,
 M. A. BILL.